United States Patent
Jones

(10) Patent No.: US 10,201,247 B1
(45) Date of Patent: Feb. 12, 2019

(54) PELLET GRILL WITH ELECTRIC SEARING STATION

(71) Applicant: United States Stove Company, South Pittsburgh, TN (US)

(72) Inventor: August Jones, South Pittsburgh, TN (US)

(73) Assignee: United States Stove Company, South Pittsburgh, TN (US)

( * ) Notice: Subject to any disclaimer, the term of this patent is extended or adjusted under 35 U.S.C. 154(b) by 573 days.

(21) Appl. No.: 14/075,894

(22) Filed: Nov. 8, 2013

Related U.S. Application Data

(60) Provisional application No. 61/724,408, filed on Nov. 9, 2012.

(51) Int. Cl.
*A47J 37/07* (2006.01)

(52) U.S. Cl.
CPC ..................... *A47J 37/07* (2013.01)

(58) Field of Classification Search
CPC ..................................................... A47J 27/00
USPC ....... 99/422, 423, 425; 126/49–51; 219/474, 219/521, 525, 533
See application file for complete search history.

(56) References Cited

U.S. PATENT DOCUMENTS

| | | | |
|---|---|---|---|
| 3,225,682 A * | 12/1965 | Savio | 99/446 |
| 3,252,407 A | 5/1966 | Buerki | |
| 3,444,805 A | 5/1969 | Happel et al. | |
| 3,688,084 A * | 8/1972 | Charneski | 219/537 |
| 4,823,684 A * | 4/1989 | Traeger et al. | 99/447 |
| 5,036,180 A | 7/1991 | Scott | |
| 5,355,779 A | 10/1994 | O'Brien et al. | |
| 5,719,377 A | 2/1998 | Giebel et al. | |
| 6,102,028 A | 8/2000 | Schlosser et al. | |
| 7,342,202 B2 | 3/2008 | Bachinski et al. | |
| 8,053,707 B2 * | 11/2011 | Hoyles et al. | 219/404 |
| 2008/0163763 A1 * | 7/2008 | Hoyles et al. | 99/444 |
| 2009/0314278 A1 | 12/2009 | Bruno et al. | |

* cited by examiner

*Primary Examiner* — Tu B Hoang
*Assistant Examiner* — Thomas Ward
(74) *Attorney, Agent, or Firm* — Pitchford Fugett, PLLC; Mark A. Pitchford; Eric B. Fugett

(57) ABSTRACT

A grill includes a cooking surface. The cooking surface includes at least one grate. The grate has internal heating elements operable to raise the temperature of the great above the temperature achievable via a heat source of the grill. The grate may be referred to as a searing station. In one embodiment, the grill is a wood pellet grill, the heat source is burning wood pellets in a burnpot of the grill, and the heating elements are resistive heating elements fully contained within slats of the grate. A searing station is especially suited for wood pellet grills which operate at lower temperatures than conventional gas or charcoal grills because it combines the slow cooking characteristics of a pellet grill with the quick searing capabilities of an infrared gas grill. The searing station may, however, be used in any type of grill.

10 Claims, 4 Drawing Sheets

PELLET GRILL WITH ELECTRIC SEARING STATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to U.S. Provisional Patent Application Ser. No. 61/724,408 filed Nov. 9, 2012 entitled "PELLET GRILL WITH ELECTRIC SEARING STATION."

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Barbeque grills apply heat to food from a heat source below a food support surface in order to cook the food. The support surface or cooking surface for most barbeque grills is typically a metallic grate, a ceramic coated metallic grate, or an arrangement of multiple grates. The heat source radiates heat to the grates and through holes or voids in the grate. These grates are designed to provide conductive heat flow to the food by conducting or transferring received heat radiated from the heat source to the food. These grates also provide convective heat flow from the heat source below the grate via the holes or voids in the grate. The convective heat flow from the heat source rises and/or radiates to the food on the grate (i.e., food support surface) through the holes or voids in the food support surface (i.e., the grate).

A wood pellet grill is a type of barbeque grill that utilizes wood pellets as fuel for the heat source. Wood pellet grills are typically used as smokers or slow cookers due to their ability to maintain a stable, low temperature over a long period of time and general inability to provide controlled, high surge of heat followed by a reduced cooking temperature. A wood pellet grill has a fuel storage area or hopper that contains wood pellets. A small motor and gears power an auger system that provides metered delivery of the wood pellets from the hopper to a burnpot of the wood pellet grill. The burnpot is the location where the solid fuel combustion takes place (i.e., the heat source). Forced combustion air is routed through the burnpot by a combustion blower or fan in order to burn the fuel (i.e., wood pellets) in a clean and controlled manner. The fire in the burnpot burns under a heat shield that is designed to evenly distribute the intense and narrowly focused heat generated in the burnpot across the grill surface (i.e., food support surface or grates) and eliminate hot spots on the cooking surface. Generally, this greatly reduces convective heating of the food via direct radiation of heat from the heat source. Food can be applied to the cooking surface (i.e., food support surface) or grates and cooked as desired. The fuel (i.e., wood pellets) is typically ignited by an electrical resistive heating element that is in contact with the fuel or in close proximity to fuel that has been moved from the hopper into the burnpot during an ignition or startup sequence. A proportional, integral, derivative (PID) type controller controls the auger to control the fuel in the burnpot and temperature of the grill, and controls the resistive heating element during the ignition or startup sequence.

Wood pellet grills typically have maximum operating temperatures of 400 to 500° F. and therefore typically lack the ability to sear foods on the cooking surface (i.e., impart significant conductive heat from the support surface or grates to the food on the support surface). Wood pellet grills principally rely on indirect (i.e., not direct radiation such as infrared radiation emanating from the heat source to the food such as infrared energy emanating from a fire), convective heating of the food on the cooking surface to cook the food. Therefore, wood pellet grills tend to perform more like a conventional convection oven and less like a gas or charcoal grill. Wood pellet grills excel at smoking and/or slow cooking meats at low or medium cooking temperatures while imparting a distinct but pleasant wood cooked flavor. Even though an intense heat can be generated in the burnpot, the heat must be indirectly applied to the food on the cooking surface in order for the cooking to be properly controlled and even distributed to the food.

BRIEF SUMMARY OF THE INVENTION

In one aspect of the invention, a wood pellet grill includes a food support surface (i.e., cooking surface) having a pair of rails connected by a plurality of tubes. One or more resistive heating elements are substantially enclosed within the tubes. When beginning to cook food, the resistive heating element(s) may be powered by a power source to quickly sear the food before slow cooking the food at a low to medium temperature by the wood pellet grill.

In another aspect, a grill includes a cooking surface. The cooking surface includes at least one grate. The grate has internal heating elements operable to raise the temperature of the great above the temperature achievable via a heat source of the grill. The grate may be referred to as a searing station. In one embodiment, the grill is a wood pellet grill, the heat source is burning wood pellets in a burnpot of the grill, and the heating elements are resistive heating elements fully contained within slats of the grate. A searing station is especially suited for wood pellet grills which operate at lower temperatures than conventional gas or charcoal grills because it combines the slow cooking characteristics of a pellet grill with the quick searing capabilities of an infrared gas grill. The searing station may, however, be used in any type of grill.

In another aspect, a searing station is operable to sear food and support the food while cooking. The searing station includes a first rail, a second rail, a heating element, and a plurality of tubes. Each tube of the plurality of tubes extends between the first rail and the second rail. At least one tube of the plurality of tubes at least partially encloses the heating element.

In another aspect, a pellet grill is operable to sear and cook food. The pellet grill includes a hopper, a burnpot, an auger, and a cooking surface. The hopper is operable to contain pellets. The pellets are solid fuel (e.g. wood pellets). The burnpot is operable to receive the pellets from the hopper and contain the pellets during combustion. The auger is operable to move the pellets to the burn pot form the hopper. The cooking surface is configured to receive heat generated form combustion of the pellets in the burnpot. The cooking surface includes a searing station operable to sear food and support the food while cooking. The searing station includes a first rail, a second rail, a heating element, and a plurality of tubes. Each tube of the plurality of tubes extends between the first rail and the second rail. At least one tube of the plurality of tubes at least partially encloses the heating element.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified.

Figure 1:
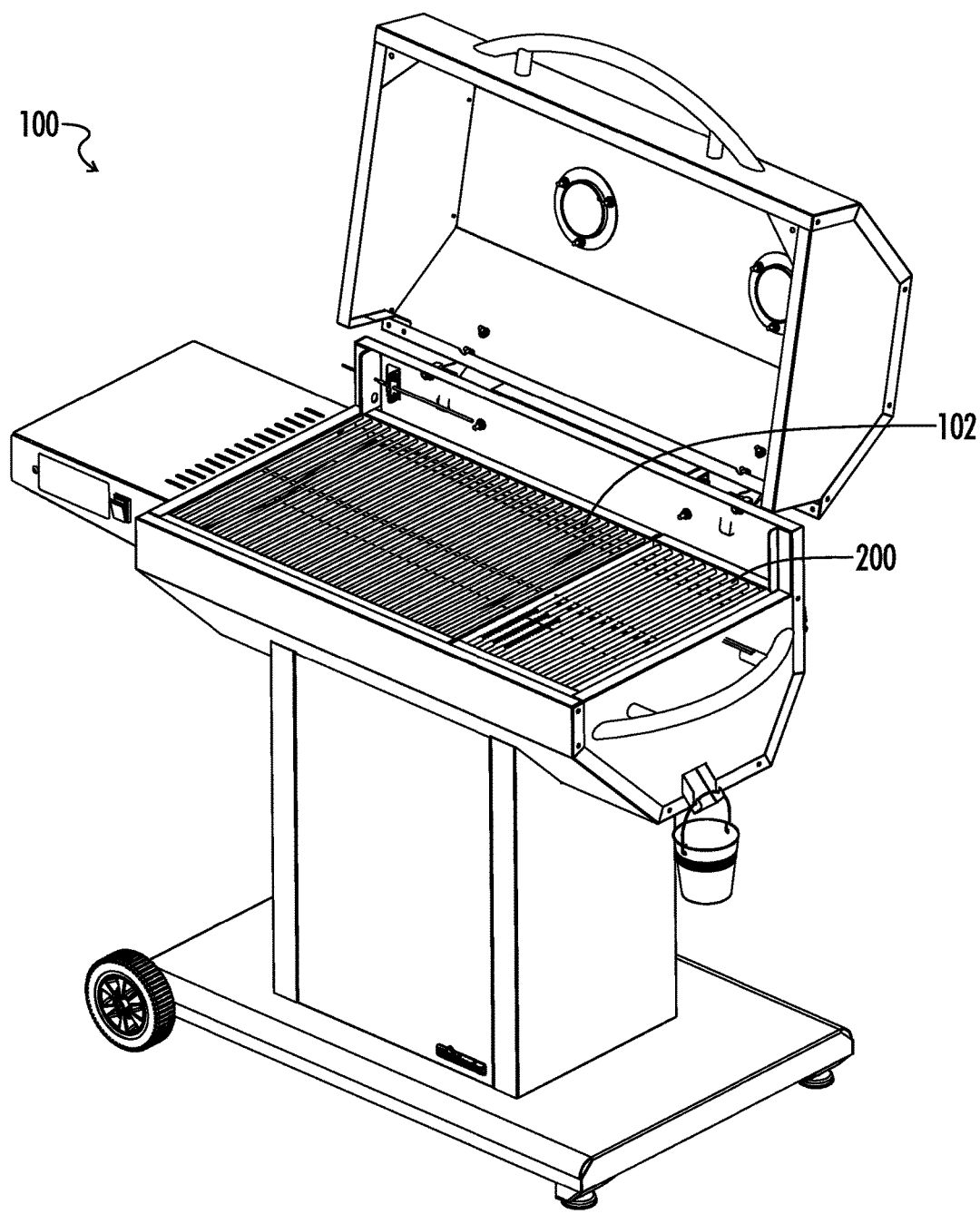
FIG. 1 is an isometric perspective view of a wood pellet grill.
Figure 2:
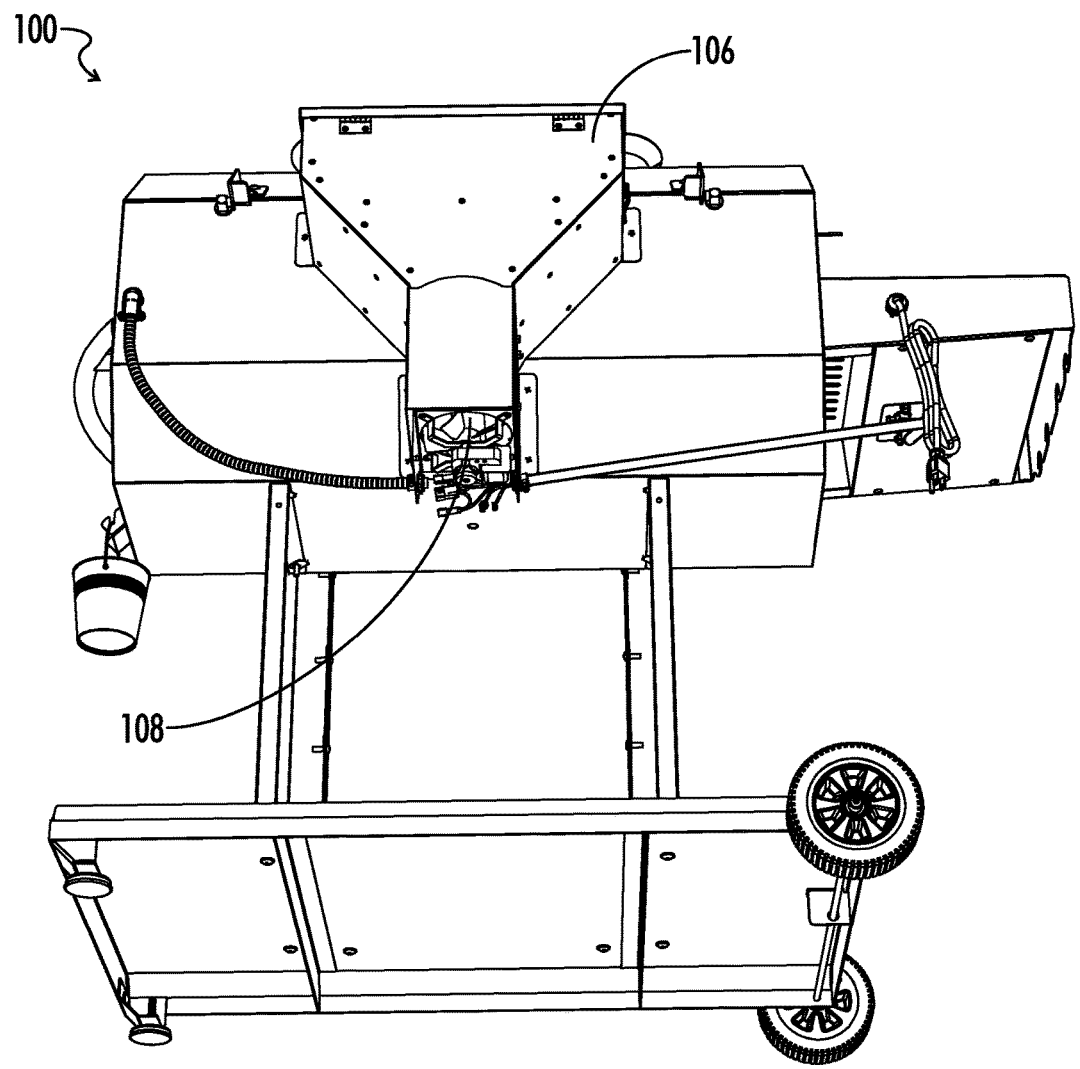
FIG. 2 is a depressed rear isometric perspective view of a wood pellet grill.
Figure 3:
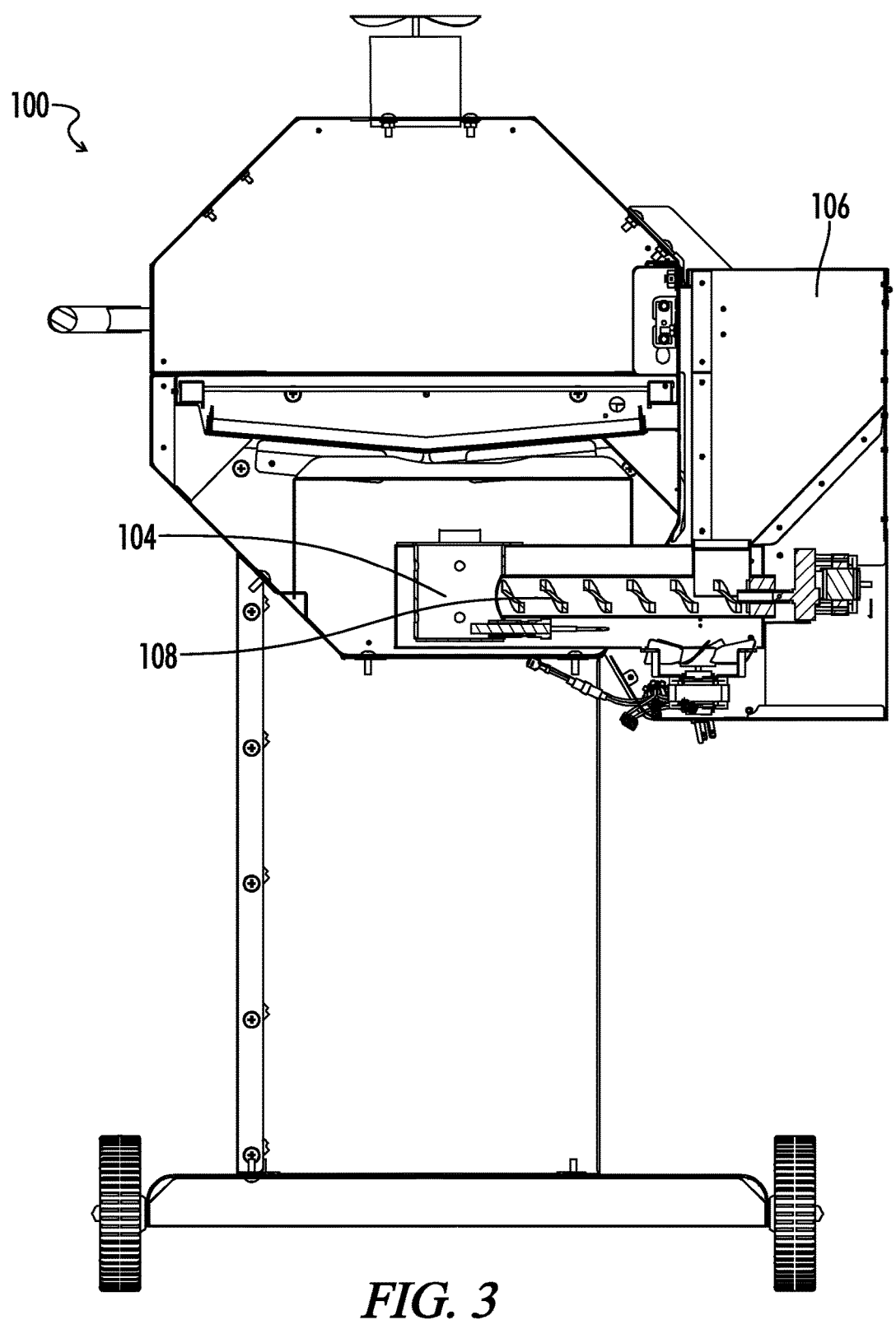
FIG. 3 is a side cutaway view of a wood pellet grill.
Figure 4:
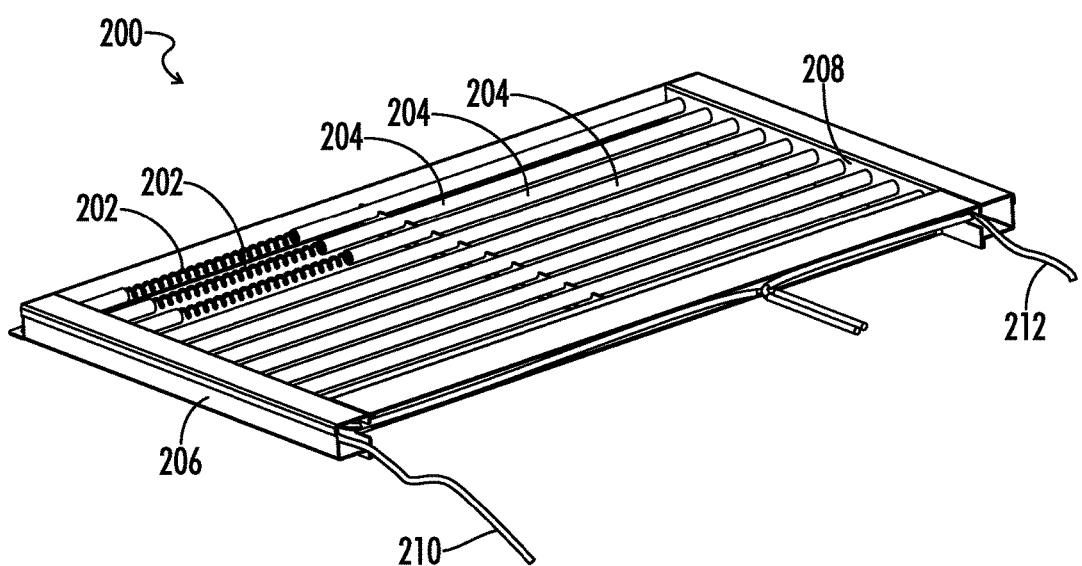
FIG. 4 is a partial cutaway isometric view of a searing station.

Referring to FIGS. 1-4, a pellet grill 100 includes a hopper 106, an auger 108, and a burnpot 104. A controller of the pellet grill 100 actuates a motor of the auger 108 to move pellets (e.g., wood pellets) to the burnpot 104 from the hopper 106. The burnpot 104 is operable to receive the pellets from the hopper 106 and contain the pellets during combustion of the pellets. The controller also operates an ignition source (e.g., a resistive heating element or an electronically controlled pilot light) to initiate and/or maintain combustion of the pellets in the burnpot 104. Optionally, the controller may actuate a forced air system for supplying the pellets in the burnpot 104 with fresh combustion air. The grill 100 also includes a cooking surface 102. A portion of the cooking surface 102 is capable of heating to temperatures above grill operating temperatures in order to sear foods. This portion of the cooking surface 102 or grates may be referred to as a searing station 200. The searing station 200 internally houses electrical resistive heating elements 202. These heating elements allow the temperature of the grate itself to raise above the temperature achievable by the heat source below (i.e., combustion of pellets in the burnpot 104. The heat generated in the searing station 200 of the pellet grill 100 is greater than the convection heat provided from the heat source (i.e., pellet burnpot 104) such that the grill 100 can sear food that is being cooked on the cooking surface 102. Operation of the electrical resistive heating elements 202 may be manually controlled or actuated and timed (i.e., powered on for a predetermined period of time) by the controller.

In one embodiment, the searing station 200 is formed into a grate. The searing station grate 200 may substantially match (i.e., have a similar size and shape as) one or more other grates of the cooking surface 102. Alternatively, the searing station 200 may be the only grate of the cooking surface 102 on relatively small grills. The searing station 200 includes an arrangement of generally parallel separate bars or tubes 204. Each tube 204 houses a heating element 202 such as an electrically resistive coil or wire. These heating elements 202 are controlled centrally on the barbeque grill by a simple on/off system, phase angle modulation, or alternate methods that are constrained by time, temperature, or voltage based set points. In one embodiment, the searing station 200 is turned on and/or off by a PID controller (i.e., the controller) controlling ignition and operation of the grill 100. For example, the searing station 200 may be on while the controller is igniting pellets in a burnpot 104 of the grill 100, and the controller turns the searing station 200 off when the grill 100 reaches a user set or predetermined cooking temperature, or after a predetermined time. When the tubes 204 of the searing station 200 are not being heated internally, they function the same as the standard grates on the grill and would not show any difference in cooking characteristics when compared to the remainder of the cooking surface 102. In one embodiment, the heating elements 202 are substantially contained within and enclosed by the tubes 204 and a first rail 206 and a second rail 208 of the searing station 200. This prevents juices from food on the searing station 200 from corroding the heating elements 200. In one embodiment, the tubes 204 each have a first end and a second end opposite the first end. The first ends of each of the tubes 204 are welded to the first rail 206, and the second ends of each of the tubes 204 are fully welded to the second rail 208 to form this sealed joint. One skilled in the art will appreciate that the tubes 204 may also be formed integrally with at least one of the rails 206, 208. In one embodiment, a power supply operable to power the heating elements has a power line 210 in the first rail 206 and a ground line in the second rail 208. Alternatively, the second rail 208 may be grounded via ground line 212 connected directly to it, and a ground side of the heating elements 202 are attached directly to the second rail 208. Each heating element 202 is electrically connected between the power line 210 and the ground 212. In one embodiment, the combination of at least partially enclosing the power line 210 and the ground 212 in the first and second rails 206, 208 and the tubes 204 and the sealed joints formed between the tubes 204 and rails 206, 208 cooperate to prevent juices from the food on the support surface 200 from contacting the heating elements 202. This prevents or at least substantially retards corrosion of the heating elements 202.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful Pellet Grill with Electric Searing Station, it is not intended that such references be construed as limitations upon the scope of this invention except as set forth in the following claim.

What is claimed is:

1. A pellet grill operable to sear and cook food, said pellet grill comprising:
   a hopper operable to contain pellets, wherein the pellets are solid fuel;
   a burnpot operable to receive the pellets from the hopper and contain the pellets during combustion;
   an auger operable to move the pellets to the burn pot from the hopper; and
   a cooking surface configured to receive heat generated from combustion of the pellets in the burnpot, wherein the cooking surface comprises a searing station operable to support and sear food, said searing station comprising:
   a first rail;
   a second rail;
   a heating element; and
   a plurality of tubes extending between the first rail and the second rail such that the first rail, second rail and plurality of tubes extending there between form a support surface for the food, wherein at least one tube of the plurality of tubes at least partially encloses the heating element.

2. The pellet grill of claim 1, wherein the heating element is fully enclosed by the first rail, second rail, and the plurality of tubes.

3. The pellet grill of claim 1, wherein the searing station further comprises a plurality of heating elements, wherein the first rail, second rail, and at least one tube of the plurality of tubes cooperate to fully enclose each heating element of the plurality of heating elements.

4. The pellet grill of claim 1, wherein the heating element is an electric resistive heating element.

5. The pellet grill of claim 1, wherein the first rail and the second rail are attached to at least one tube of the plurality of tubes by a sealed joint configured such that juices from food on the searing station cannot run off of the plurality of tubes onto the heating element.

6. The pellet grill of claim 1, wherein the first rail is fully welded to a first end of at least one tube of the plurality of tubes and the second rail is fully welded to a second end opposite the first end of the at least one tube of the plurality of tubes.

7. The pellet grill of claim 1, wherein the heating element is a resistive coil.

8. The pellet grill of claim 1, wherein a power supply has a power line and a ground line, and wherein the power line is at least partially enclosed in the first rail and connected to the heating element, and the ground line is at least partially enclosed in the second rail and connected to the heating element.

9. The pellet grill of claim 1, wherein the searing station is a grate of a plurality of grates forming a cooking surface of a pellet grill.

10. The pellet grill of claim 1, wherein:
   the heating element is one of a plurality of heating elements of the searing station;
   the searing station further includes a power supply having a power line and a ground line;
   the power line is in the first rail;
   the ground line is in the second rail; and
   each heating element of the plurality of heating elements is electrically connected between the power line in the first rail and the ground line in the second rail.

* * * * *